Oct. 6, 1953　　　H. MEYER ET AL　　　2,654,496
MACHINE FOR AFFIXING TABS TO ARTICLES
Filed Feb. 5, 1951　　　　　　　　　7 Sheets-Sheet 1

Hans Meyer and Ronald W. Shepherd
　　　　　　　　　　　　Inventors

Oct. 6, 1953 H. MEYER ET AL 2,654,496
MACHINE FOR AFFIXING TABS TO ARTICLES
Filed Feb. 5, 1951 7 Sheets-Sheet 2
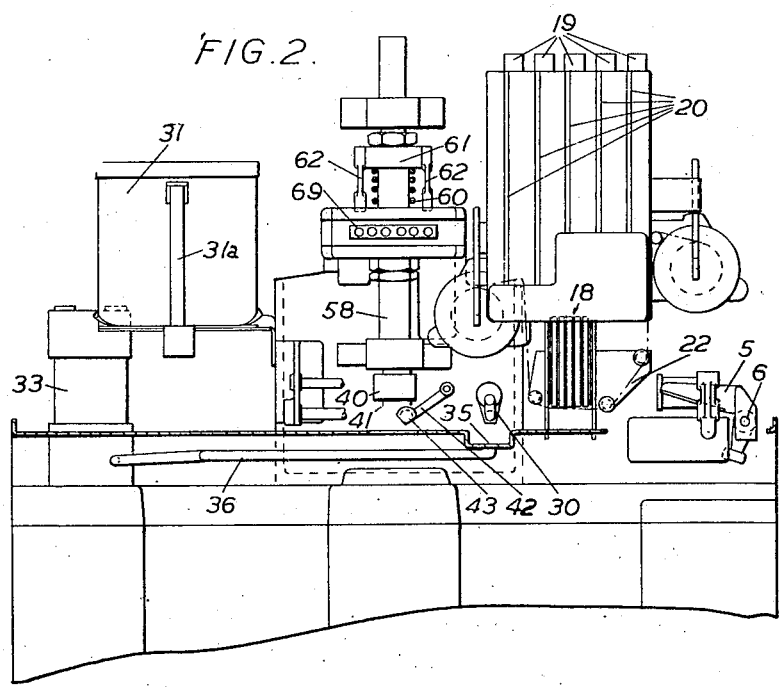
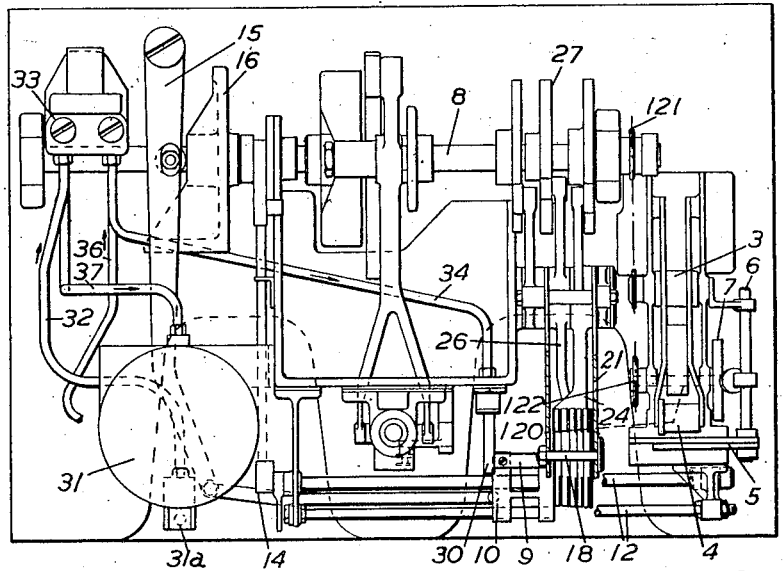
Hans Meyer and Ronald W. Shepherd
Inventors
By
Thenderoth, Lind & Ponack
Attorneys

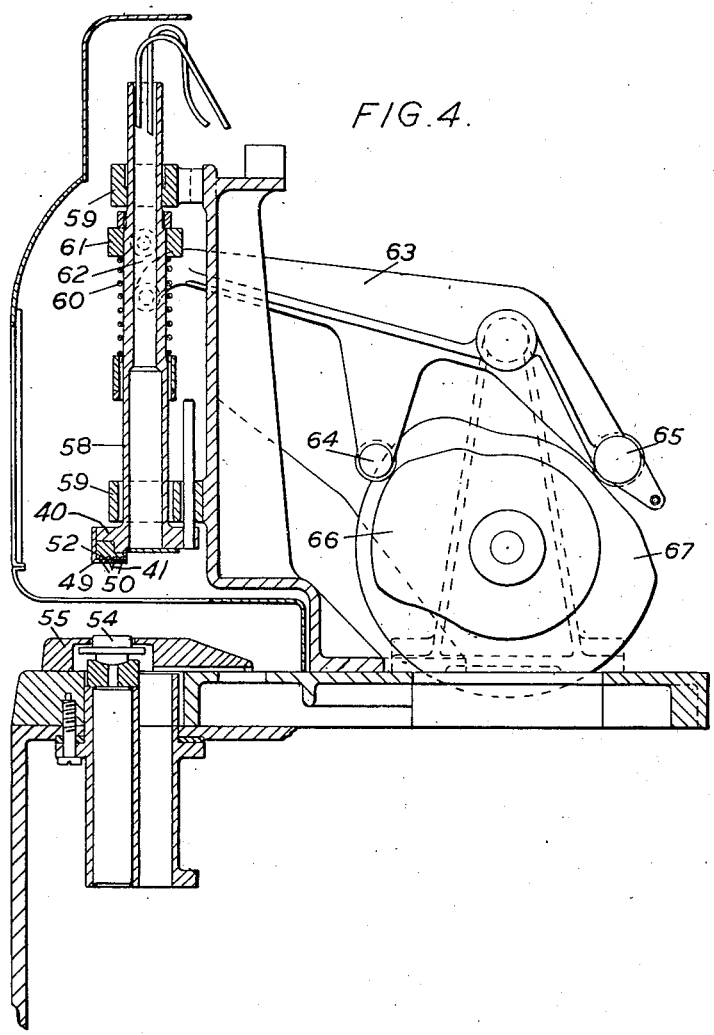

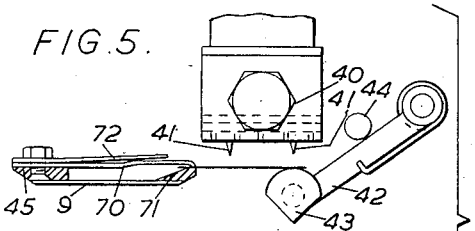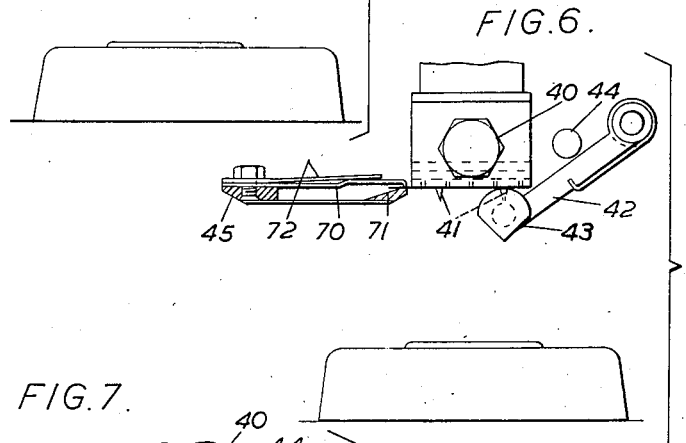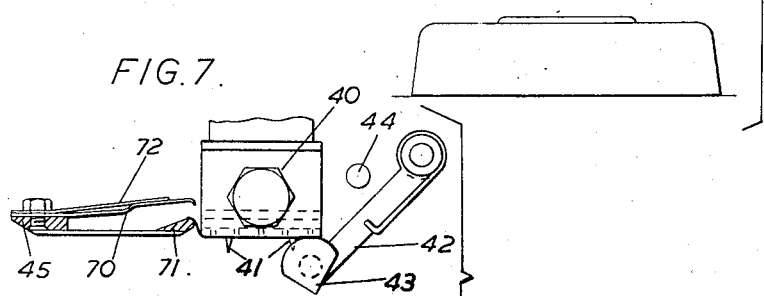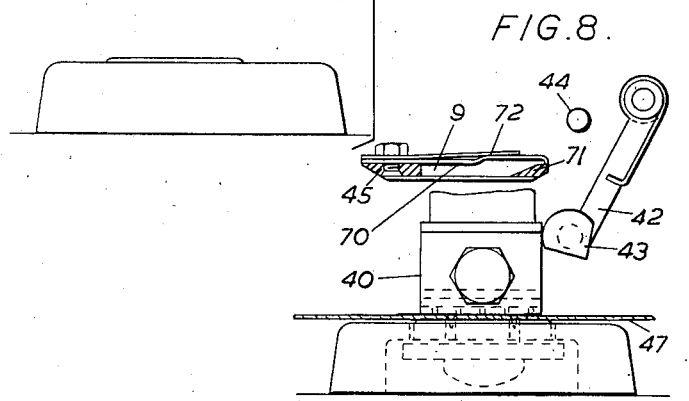

Oct. 6, 1953 H. MEYER ET AL 2,654,496
MACHINE FOR AFFIXING TABS TO ARTICLES
Filed Feb. 5, 1951 7 Sheets-Sheet 5
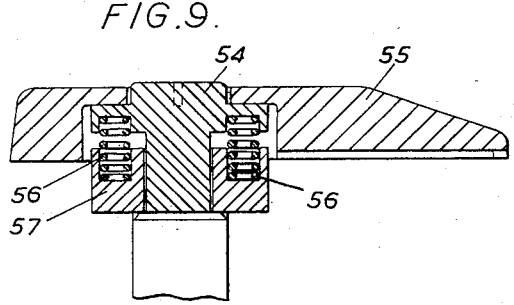
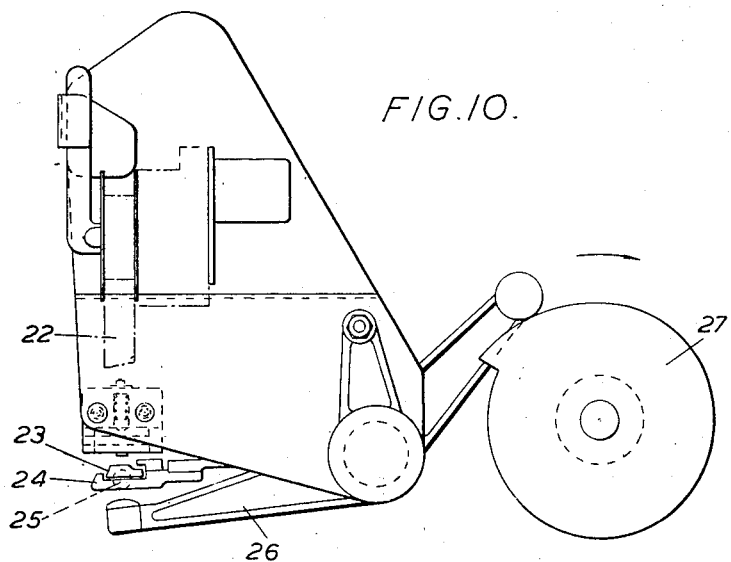
Hans Meyer and Ronald W. Shepherd Inventors.
By
Shenderoth, Lind + Ponack
Attorneys.

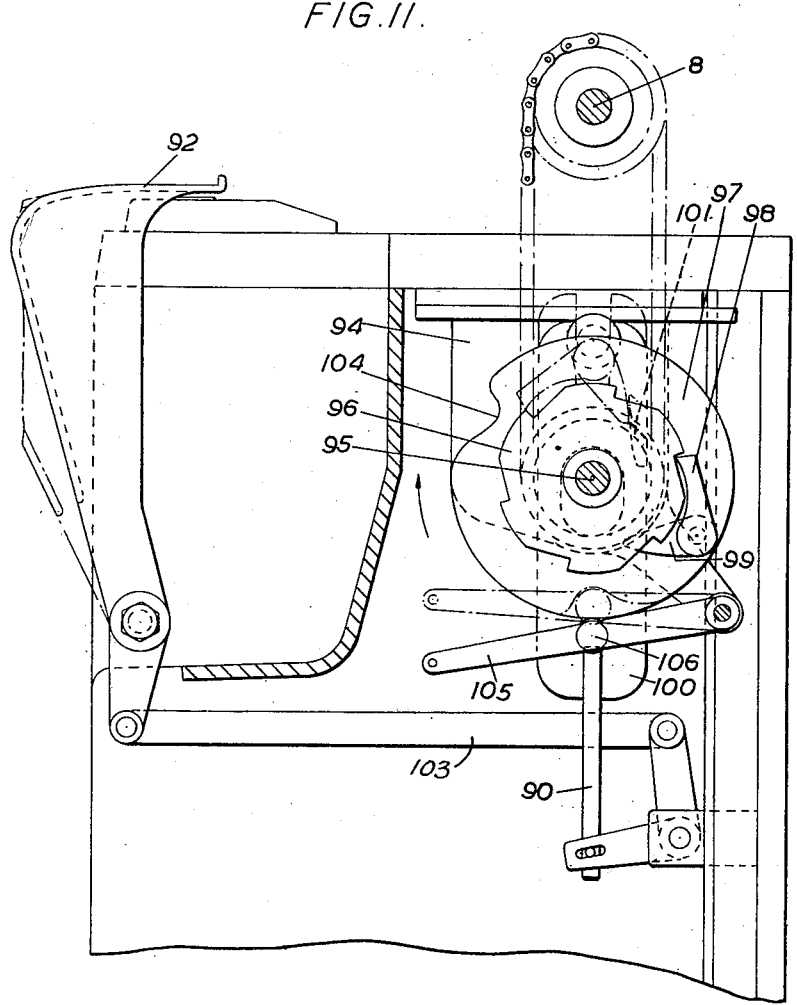

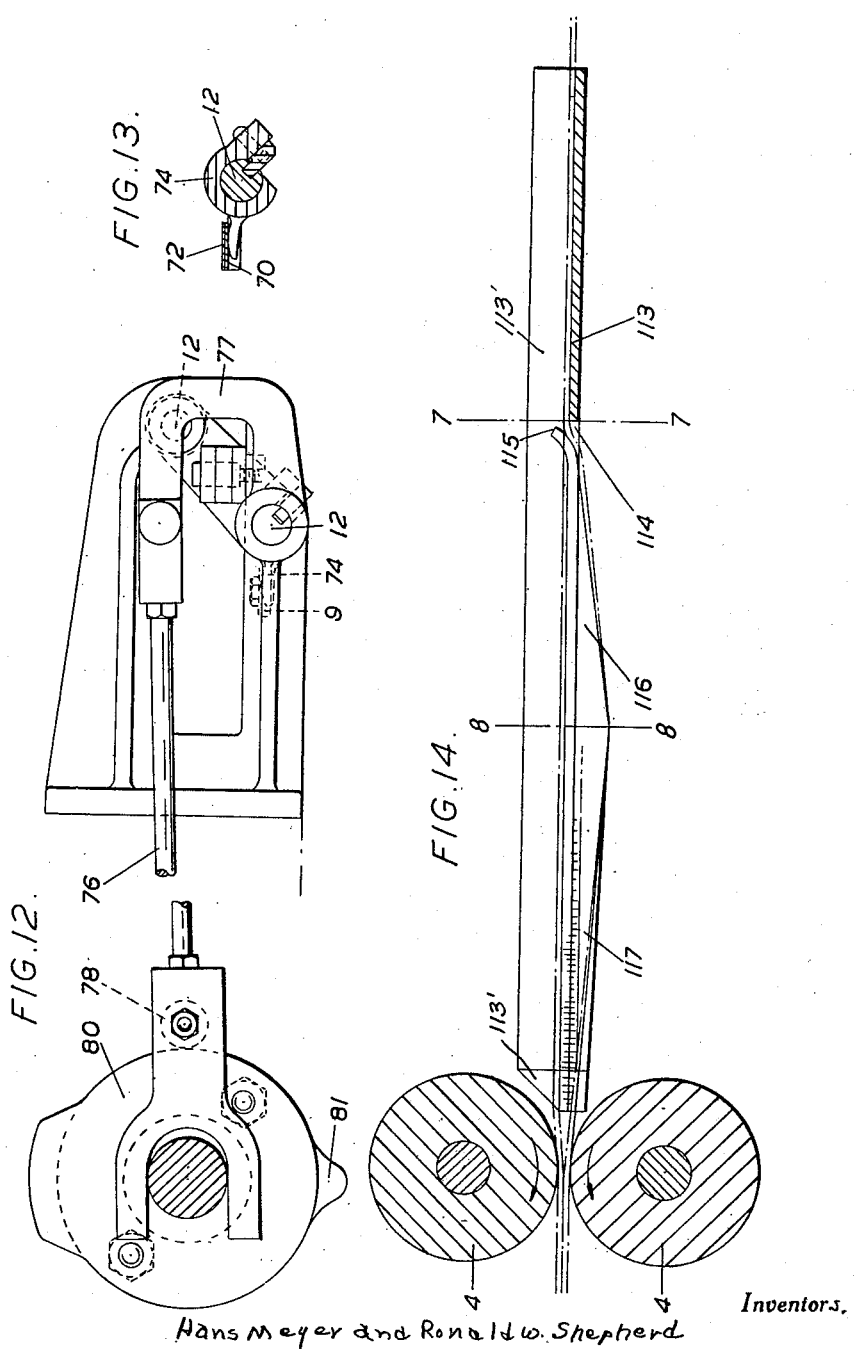

Patented Oct. 6, 1953

2,654,496

UNITED STATES PATENT OFFICE

2,654,496

MACHINE FOR AFFIXING TABS TO ARTICLES

Hans Meyer, Richmond Hill, Richmond, and Ronald W. Shepherd, Stoke Bishop, Bristol, England; said Shepherd assignor to said Meyer Application February 5, 1951, Serial No. 209,442
In Great Britain February 7, 1950

14 Claims. (Cl. 216—2)

This invention relates to machines for and methods of affixing tabs, containing or consisting of thermoplastic material, to articles, especially textile articles, by heat and pressure, each such tab being easily removable (when no longer required) by using a free part of the tab as a finger piece by means of which the tab may be torn off. Tabs of this kind are ordinarily intended for use in connection with laundry and dry cleaning work, but are not exclusively applicable thereto, as they may be used for such purposes as price marking. It follows that the tab should be sufficiently strongly bonded to the articles to resist the ordinary immediate stresses, arising in washing, dry cleaning, etc., but not so firmly bonded as to cause difficulty in separating the tab from the article by means of the finger piece.

For most purposes the tabs need to be marked, as for example in the case of price tabs or identification tabs applied to clothing in a laundry or dry-cleaning depot, and such marking may be effected either prior to their use in a tab-applying machine or while each tab is in transit from the tab supply point to the point at which the tabs are subjected to heat and pressure to effect bonding to the article to be marked. In a machine for applying a large number of identical tabs to a succession of articles it is probably advantageous to print a web of material at predetermined intervals and then to sever the roll at like intervals to form printed tabs.

In laundry or dry cleaning marking or the like, on the other hand, it is desirable to cut, print and bond a tab in one cycle of operations, since the marking indicia will have to be changed at frequent intervals and if the printing section is in advance of the severing section and bonding section, mistakes will inevitably arise.

It is an essential that such tabs be rendered in a condition to permit them to be bonded by heat and pressure and upon the various methods used to achieve such result will depend some of the features of construction of machines for applying such tabs.

The tabs may consist of strip material, such as a woven fabric, paper, regenerated cellulose film, such as that known under the registered trade-mark "Cellophane," woven fibre glass or the like. It is essential that one side should be rendered thermoplastic before application to the article and this may be achieved by applying a coating of a thermoplastic material to one side of the strip material. Alternatively a thermoplastic material may be formed as a separate film and applied to the strip material. The preferred method, however, is to have a woven textile fabric, which includes a proportion of yarns or filaments of a thermoplastic material. This is particularly the case with laundering or cleaning, because with a sufficiently loosely woven fabric the washing liquors can penetrate the tab to wash the fabric behind it as they would be unable to do if an impervious layer of thermoplastic material were used.

A portion of the tab should remain unaffixed to the article to which it is applied so as to serve as a finger piece for ultimate removal of the tab from the article to which it is bonded.

There are various methods of ensuring that such a finger piece is left. The most convenient method is to leave a free end of the tab projecting from between the platens by which heat and pressure are applied, so that it is unaffected by this operation. A second method of achieving this end is to leave one edge portion of a preformed roll of strip material free from thermoplastic material. A third method applied to a tape coated on one side with a thermoplastic film of low bonding temperature is to form an edge fold of the material to mask a portion of the thermoplastic film and present an uncoated edge portion, which will not be caused to adhere to the article in subsequent ironing. The present invention is concerned with a machine for applying tabs of the general class set out above which is constructed to operate in an improved manner.

One of the most important improvements introduced by the present invention relates to the means for presenting the tabs to the means for applying heat and pressure to effect the bonding. In the present construction a tab is carried under a heated platen and is then simultaneously released by its carrier and transferred to a locating means on the face of the platen so that it is controlled at all times until it is actually bonded on to the article.

One convenient means of effecting this purpose is to provide a pin or pins (preferably two pins) projecting from the lower surface of the face plate of the platen which pierce the tab and so locate it on the platen for controlled descent.

In order to pierce the tab, a pressure roller mounted on a rockable arm, spring biassed in an upward direction, is normally located beneath the upper platen. Its position is such that the tab and its grippers can pass freely over it. A circumferential groove is formed on the roller in alignment with the spike. The gripping means draws each tab into position under the face of the upper platen and the trailing edge of the tab is, therefore, supported by the said roller until the top platen descends, when, on meeting the resistance of the spring, the spike is made to penetrate the tab. Simultaneously, the grippers are made to open and release the tab. The continued descent of the platen sweeps aside the roller, leaving the tab impaled on the spike, the roller being pressed against the side of the platen ready to return as soon as the platen ascends. A recess may be formed in the face of the lower platen to register with and accommodate the tip of the spike when the upper platen reaches the lower platen.

Other means, such as suction, could also be employed for the purpose of holding the tabs on the platen after release from their carrier.

Another important improvement introduced in the present invention relates to the actual bonding operation, and consists in using a heated platen in direct contact with the tab being applied and providing means for ensuring that the tab does not adhere to the platen, as well as to the article.

In the case where the tabs are cut from a woven fabric including a proportion of yarns or filaments of a thermoplastic material such as cellulose acetate, it is found to be desirable to spray a solvent for the thermoplastic on to the tabs before bonding, so that the temperature of the heated platen need only be a little above that of boiling water and to accelerate the softening of the thermoplastic material for quicker operation of the machine. In order to prevent the tabs from sticking to the heated platen with which they are in contact, a little water is added to the solvent sprayed on to the tab. It is found that the steam generated underneath the platen head effectively prevents adhesion of the tabs to the platen.

As a consequence of this step it is found desirable to provide vents in the platen to allow the steam to escape, while the platen is still applying pressure and for this purpose vertical holes are formed in the face of the platen which communicate with lateral discharge passages. The vents for example may comprise vertical holes in a face plate attached to the undersurface of a laterally grooved platen head, the holes in the one registering with the grooves in the other.

In order that the invention may be more fully understood reference is made to the accompanying drawings wherein:

Figure 2 is a front view of the machine with its cover removed.

Figure 3 is a plan showing the general arrangement of most of the operative moving parts.

Figure 4 is a vertical section of the upper platen drive and the lower anvil on an enlarged scale.

Figures 5 to 8 show diagrammatically the transfer of the tabs from the gripper to the platen.

Figure 9 is a section of a modified form of bottom platen for use with the invention.

Figure 10 is an end view of one form of tab printing apparatus.

Figure 11 shows the arrangement of the disconnectable drive for the operating parts.

Figure 12 is a detail of the arrangement of the gripper control mechanism.

Figure 13 is a section of the gripper opening mechanism.

Figure 14 shows a device to be included in the machine for forming an edge fold where it is intended to use an adhesively coated strip material of easy bonding characteristics.

Figure 1:
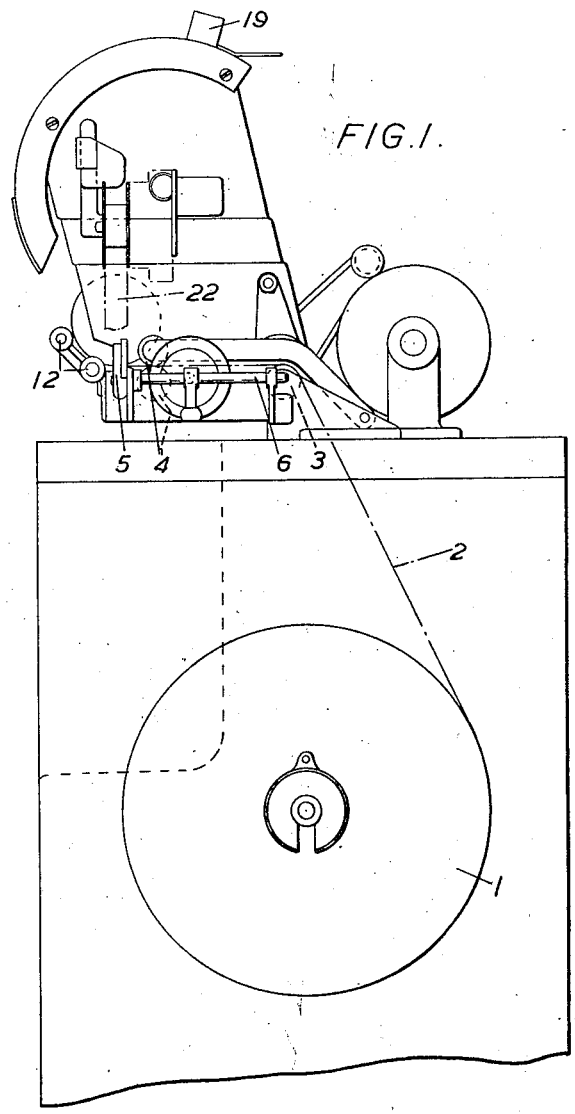
Figure 1 is an end view showing particularly the lay out of the mechanism of supplying cut tabs for succeeding operations.

In Figure 1 can be seen the apparatus for producing tabs from a roll 1 of stock material, which in the present example is an open-weave fabric containing a proportion of specially prepared cellulose acetate yarns to act as the thermoplastic material for the bonding operation. The stock material has a width corresponding to the length of the finished tabs and the web 2 of stock material is drawn up over guide roll 3 by forwarding rolls 4, the lower one of which is gear driven by a gear on the camshaft 120, which is driven by sprockets 121 and 122 from the main camshaft 8 (Fig. 3). The face cam 7 is adapted to operate a scissor knife 5 through a rockshaft 6, the scissor knife 5 operating against a stationary bottom plate.

The drive for this part of the machine is synchronised with the drive for the remainder of the machine, since it is driven from a sprocket mounted on the camshaft 8 (Figure 3), which controls the timing of all the mechanical movements involved.

The cut tabs are taken from the knife 5 by a gripper device which carries them during subsequent operations and finally presents them for application to the article to be marked.

The gripper 9 is mounted on a carriage 10 which is longitudinally slidable on a pair of guide rods 12 (partially cut away in Figure 3). The carriage 10 is given an intermittent forward motion to provide intervals for the printing and transferring operations and a steady return motion to its starting position. The carriage 10 is moved forwardly i. e. from right to left through a link 14 and lever 15 by a suitably contoured face cam 16 carried on the shaft 8, and returned by a tension spring (not shown). It is to be noted that many of the rocker arms hereinafter referred to are spring returned but the springs are omitted from the drawings for greater clarity.

The rest position of the gripper in each cycle of operations is immediately to the left of the printing mechanism, holding a cut tab in readiness under the printing wheels or printing plate, but for purposes of description each cycle is treated as starting with the severance of the tabs, although the hot platen is still in contact with the previous tab at that moment.

The gripper 9 is halted under the printing head 18, which carries five drums bearing marking figures or letters, which can be rotated to form any desired combination by moving the levers 19 to appropriate positions in the grooves 20. The construction of this type of printing head is well known and forms no part of the present invention.

The printing head 18 is mounted on a cam controlled rocker arm 21, on which a pair of spools are also supported to move with the printing head. These carry a standard typewriter ribbon 22 and are adapted to move the ribbon forward in a known manner after each printing operation.

The detail of the printing mechanism is shown in modified form in Figure 10, where the printing head 18 with five cylinders has been replaced by a carrier supporting a separate insertable impression plate. The other details are the same for both forms.

The impression plate or printing head descends at the same moment as a platform 23 is raised by rocker arm 24 (shown in Figure 10). The tab carried by the gripper is thus clamped between the typewriter ribbon 22, backed by the printing head (or impression plate) and the platform 23.

The platform 23 rests on a ball 25, so that it can accommodate itself to the shape of the raised printing surface above it.

The impression is made on the tab by the hammer rocker 26 which through the action of the snail cam 27 can snap up quickly under the influence of a tension spring (not shown) to transmit a blow to the platform plate 23 through the ball 25 and so effect an impression on the tab held in the gripper 9.

After printing the desired indicia on it, the tab is then drawn forward under a spray nozzle 30 to deposit a mixture of solvent to soften the thermoplastic fibres and water to prevent adhesion to the hot platen.

The solvent-water mixture is drawn from a reservoir 31 provided with a gauge glass 31a, through pipe 32 to the inlet of one unit of a double-unit piston pump 33, the two units of which are driven by a cam carried on the cam shaft 8, so that a quantity of fluid is delivered to the pipe 34 leading to the nozzle 30 in timed relation with the passage of the tab under such nozzle.

The excess solvent-water mixture falls into a trough 35, from which it is drawn back through pipe 36 by the second pump unit and returned to the reservoir through pipe 37.

In Figures 5 to 9 is illustrated the means by which a tab is transferred from the gripper 9, which has carried it from the guillotine through the printing and spraying operations, to the heated top platen 40, by which the tab is then pressed on to the article to be marked.

The heated platen 40 is formed as a forward extension of a reciprocating plunger member, whose operation is set out more fully with reference to Figure 4.

The platen 40 has a pair of pins or spikes 41, which project downwardly from its bottom face and are adapted to pass through a tab and hold it on the platen whilst it completes its downward stroke.

The means for supporting the tab whilst it is being transferred to the platen 40 comprises the gripper 9 at one end and a spring-loaded, pivoted arm 42 carrying a part-roller member 43, having a peripheral groove in its surface to permit the entrance of the right hand pin 41. The upward movement of the arm is limited by a stop 44.

The arm 42 is first deflected by the inclined surface 45 on the leading end of the gripper 9, but when the gripper has passed, it returns to the position shown in Figure 5, which allows both ends of the tab to be level with each other initially, before contact with the platen 40.

Owing to the resistance offered by the tab through the support given at its two ends by the gripper 9 and the roller 43, the pins 41 penetrate the tab, which is thereafter carried down by the platen 40. Further descent of the platen 40 causes the arm 42 to be moved aside and at the same time the gripper 9 is timed to release the end of the tab, which as can be seen in Figures 7 and 8 is clear of the under surface of the platen and is therefore left as a finger piece for ultimate removal of the tab.

This feature of having means for transferring the tabs from the longitudinally movable gripper to the vertically movable platen enables wide spacing to be employed between the gripper path and the bottom platen. As a result the machine can deal with articles of a variety of thicknesses.

The arm 42 is swung completely clear of the platen face (Figure 8) as the platen reaches its bottom position and presses the tab against an article, indicated at 47.

As soon as the platen 40 reaches its bottom position, the gripper 9 starts to move back to the guillotine 5 to pick up the next tab and carry it to the printing station before the end of the cycle. In returning to pick up the next tab the gripper 9 can pass over the top of the platen 40 since the latter projects forwardly of its plunger, whilst the gripper 9 projects rearwardly from the inner side of the carriage 10.

Referring to Figure 4 it will be observed that the platen 40 has a face plate 49 to which are attached the two pins 41 and in which vertical exhaust holes 50 are formed communicating with horizontal grooves 52 cut in the bottom of the platen proper.

Both the top platen 40 and the bottom platen 54 may be electrically heated, though the heaters are omitted from the drawings for extra clarity.

The lower platen 54 shown in Figure 4 and Figures 5 to 9 is rounded on its under side, resting in a part-spherical cup, to allow it to conform to the pressure of the platen 40, despite any inequality in thickness in the article. The platen 54 is of course formed with apertures to register with the pins 41 carried by the top platen 40. It also projects upwardly through a surrounding table 55, so that an article of clothing or other textile article may be stretched relatively tight over it.

In the alternative form shown in Figure 9 the lower platen 54 is supported by six small compression springs 56 resting on a base 57, so that the platen can dip in any direction if any inequality in material thickness is encountered during the bonding operation. In operation the solvent vapour and steam exhaust through the apertures formed in the bottom of the upper platen face plate and it is found that the expedient of adding water to the solvent liquid is a satisfactory precaution against the occurrence of adhesion between the tab and the top platen. However as an additional safeguard a spring-loaded foot may be mounted in the bottom end of the plunger and to the rear of the platen. This would normally project a little below the platen 40 and would be effective to provide a further separating action when the platen 40 is raised away from the lower platen 54.

Referring back to Figure 4 it will be observed that the upper platen 40 is attached to the bottom end of and extends forwardly of a reciprocable plunger 58, so that, as already explained, the gripper may pass over the top of the platen 40 when the platen is in its tab applying position and so reduce the time of the operation cycle of the machine to little more than the three seconds required for bonding the tab on to an article.

The plunger 58 is vertically slidable in guides 59, being urged upwardly by a heavy compression spring 60, which is adapted to be compressed through a collar 61.

The collar 61 is attached by links 62 to the ends of a split rocker arm 63, which is provided with cam followers 64 and 65, contacting separate cams 66, 67 to give both a positive lift and positive lower to the rocker arm 63.

A counter 69 (Figure 2) is associated with the plunger 58 to enable a record to be made of the number of articles to which tabs have been applied.

The means by which the gripper is opened and closed is illustrated in Figures 12 and 13. It will be appreciated that the gripper has to be opened twice in each cycle of operations; once to pick up a cut tab from the guillotine and secondly to release the tab at the moment when it is transferred to the top platen.

The gripper includes a relatively flexible top member 70, which is normally kept in contact with the bottom member 71 by a leaf spring 72 (see Figure 5).

To deflect the leaf spring 72 and top member 70, a lobe member 74, carried between the end lugs of the carriage 10 and rotatable relative thereto, is mounted on the lower shaft 12 (Figure 13). This lower shaft 12 is formed with a continuous key way and is rockable in its end bearings. The lobe member 74 is keyed to the shaft 12 and rockable therewith, and since the end of the lobe member is positioned between the top and bottom members of the gripper, a clockwise rocking of the shaft is effective to open the gripper.

The opening of the gripper 9 is effected in timed relation with the other operations by a rod 76, pivotably attached to one end of a U-shaped member 77 attached to the lower shaft 12.

The rod 76 has a U-shaped end which rides on the cam-shaft 8 and is adapted to open and close the gripper twice in each cycle of operations through the interaction of its cam roller 78 with two cams 80 and 81, which makes it possible to time the opening of the gripper 9 at the two extremes of its stroke.

The means for connecting and disconnecting the drive for each cycle of operations is shown in Figure 11. The operation for starting and stopping the mechanism is effected by the operator through the rod 90, which may be connected either to a foot pedal or to a pivotal table 92, replacing the table 55, or moving immediately above it, through a system of links.

The movable table 92 enables the starting of the machine to be automatically co-ordinated with the insertion of an article into the machine for marking, but an experienced operator can obtain a quicker cycle by using a foot control, since the machine can start and print the tab, before the article is actually inserted between the platens.

The drive is taken from an electric motor through a gear-box 94; the speed of the output shaft 95 of the gearbox then being sufficiently reduced for the present purpose.

On the output shaft 95 is keyed a ratchet wheel 96, which is thus constantly turning, so long as the motor is running.

A disc 97 freely rotatable on the shaft 95, carries a front pawl 98, and a rear pawl 99. A plate, 100, situated behind the disc, 97, has vertical movement and carries a block 101. When the platform 92 is moved inwards, or the pedal depressed, the plate 100 is pulled downwards by the connecting linkage 90, 103, and the block 101 is moved out of the way of the rear pawl 99 (shown chain dotted in a position of rest). The front pawl 98 and the pawl 99 are fixed on the same shaft and pawl 98 is spring biassed in an anti-clockwise direction, and this outer pawl can then engage with a tooth on the ratchet wheel 96, and is driven round until such time as the plate 100 is again raised by the upward movement of the rod 90. When this occurs, the block 101 occupies a position where it is met by the rear pawl 99 and the pawl 98 is disengaged from the ratchet wheel. To ensure that it shall completely disengage and to avoid any danger of premature engagement, the disc 97 has a recess 104 formed in its periphery and a spring loaded lever 105 has a roller 106 which, engaging with this recess, acts to push the disc a little further around in a clock-wise direction than it would normally be pushed by the pawl 98, and thus creates a clearance between the tip of the pawl 98 and the tips of the teeth on the ratchet wheel.

Normally, however, the platform 92 is not used, and instead the plate 100 is connected by the vertical rod 90 to a foot pedal, which is depressed to release the clutch and then allowed to rise, when the clutch is knocked out after one revolution.

The disc 97 is connected to a chain sprocket which transmits drive to a further chain sprocket mounted on the cam shaft 8.

As has already been explained it may be desirable in some circumstances to use strip material with a thermoplastic coating on one side which is sensitive to ironing, so that tabs cut therefrom have to have one edge formed into a doubled over portion to ensure leaving a finger piece. Since a material having a double thickness at only one edge is very difficult to form into a roll, it is desirable to form the edge fold actually in the machine before separate tabs are cut off by the knife.

A piece of apparatus for performing this function is shown in Figure 14 and would be inserted between the draw rolls 4 and the stock roll holder. In this figure 113 is a shallow trough or low-walled track suited to the width of the strip material to be folded. At the transverse plane of the track a longitudinal slot 114 commences and at the front end of the slot the floor of the track is also slotted to enable a tongue 115 to be upturned. The distance of the slot 114 from the wall 113' of the track determines the degree of eventual fold-over of the strip material. As the strip material is fed along the track one edge comes against the tongue 115 and is thereby deflected downwards and this downward deflection is progressively increased as the strip travels between the transverse planes 7—7 and 8—8 by a cam 116 which extends below the undersurface of the track and is of such a shape that the deflection progressively reaches a maximum of 90° over a progressively increasing width reaching a maximum determined by the distance of the slot 114 from the track wall 113' as above described, by which time a right-angled turned-down edge or flap has been formed in the strip material. At the stage of travel represented by the transverse plane 8—8 another kind of cam designated 117 is encountered presenting an upwardly inclined ledge of progressively increasing width for contact with the outer surface of the turned-down edge or flap of the strip material whereby the said turned-down edge or flap is induced to turn inwards and upwards towards the underside of the main body of the strip material and eventually become a fully folded-over portion as required. The strip material is then passed between the draw rolls 4 and guillotined as before.

We claim:
1. A machine for marking textile articles comprising a longitudinally movable gripper for carrying printed tabs successively beneath a verti- cally movable heated platen, said gripper gripping one end of a tab, a deflectable spring arm partially under said platen to support the other end of said tab, means associated with the platen for picking up said tab from said gripper and said spring arm and means for substantially simultaneously releasing the tab from the gripper.

2. A machine for marking textile articles according to claim 1 comprising a pair of rods, a carriage longitudinally movable thereon, a gripper mounted on said carriage, means for delivering tabs successively to said gripper, means for printing marking indicia on a tab carried by the gripper, means controlling said gripper to move the tab under said printing means, an upper heated platen, at least one pin projecting from the under surface of said platen, a deflectable spring arm partially under said platen adapted to support one end of a tab carried under said platen by said gripper, means for moving said upper platen downwards to cause said pin to penetrate said tab and deflect said arm and means for substantially simultaneously releasing said tab from said gripper and a lower platen to support an article against which the upper platen presses the tab.

3. A machine for marking textile articles comprising a longitudinally movable gripper means adapted to grip one end of successive tabs having a thermoplastic content, means for printing marking indicia on the tab, carried by the gripper, in timed relation to the movement thereof, means for applying a water-solvent mixture on to said tab in timed relation to the movement of said gripper, a heated upper platen and a lower platen for bringing the tab into contact with an article under conditions of heat and pressure, means for moving said upper platen in timed relation to the gripper movement, pin means associated with the platen for piercing and picking up the tab from the gripper and means acting substantially simultaneously to release the tab from the gripper.

4. A machine for marking textile articles comprising in combination a stationary lower platen to support an article to be marked, a vertically movable plunger, a heated upper platen forming a forward extension of said plunger, a longitudinally movable carriage, a gripper extending rearwardly of said carriage adapted to receive successsive tabs having a thermoplastic content from a tab-supplying station and carry them to a position underneath said upper platen, means associated with the upper platen for taking up a tab from the gripper, means for substantially simultaneously releasing the tab from the gripper, means for continuing the movement of the upper platen to press the tab to contact with an article supported on the lower platen, the lower platen being so positioned relative to the path of the gripper that the gripper is permitted to return over it to the tab-supplying station whilst the upper platen remains in its pressure applying station.

5. A machine for marking textile articles comprising in combination a longitudinally movable gripper means adapted to grip one end of successive tabs having a content of a thermoplastic substance, means for supplying tabs to the gripper at a tab-supplying station, means for printing marking indicia on the tab carried by the gripper, means for applying a solvent-water mixture to said tab, a stationary lower platen for the support of an article to be marked, a vertically movable heated upper platen, a deflectable arm extending partially under the upper platen to form a support for the free end of the tab, pin means associated with the upper platen for picking up the supported tab and means for substantially simultaneously releasing the tab from the gripper, said arm being deflectable from underneath the descending platen through contact therewith, said upper platen descending into a pressure applying position proximate said lower platen.

6. A machine for marking textile articles comprising in combination a vertically movable heated upper platen, a stationary lower platen adapted to tilt to conform to the upper platen, said vertically movable upper platen being a forward projection carried by a vertically driven plunger, a horizontally movable carriage, a gripper mounted on and extending rearwardly of said carriage, said gripper being adapted to grip one end of a tab having a content of a thermoplastic substance, means for supplying tabs to the gripper at a tab-supplying station, means for printing marking indicia on the tab carried by the gripper, means for applying solvent-water mixture thereto, means for halting the gripper just beyond the upper platen, so that the portion of the tab held by the gripper extends beyond said platen and forms a finger piece, a deflectable arm extending partially under said platen when unstressed, to support the free end of the tab and pin means associated with the upper platen for taking up said tab from the supported position and means substantially simultaneously acting to release the tab from the gripper, said deflectable arm being wholly deflected from underneath the upper platen as it descends to its tab applying position.

7. A machine for marking textile articles comprising in combination a vertically movable heated upper platen, a stationary lower platen adapted to tilt to conform to the upper platen, said vertically movable upper platen being a forward projection carried by a vertically driven plunger, a horizontally movable carriage, a gripper mounted on and extending rearwardly of said carriage, said gripper being adapted to grip one end of a tab having a content of a thermoplastic substance, means for supplying tabs to the gripper at a tab-supplying station, means for printing marking indicia on the tab carried by the gripper, means for applying solvent-water mixture thereto, means for halting the gripper just beyond the upper platen, so that the portion of the tab held by the gripper may form a finger piece, means to support the free end of the tab and at least one pin projecting downwardly from the upper platen, adapted to penetrate the supported tab during downward movement to locate the same relative to the platen and means substantially simultaneously acting to release the tab from the gripper, said deflectable arm being wholly deflected from underneath the platen through contact therewith as it descends to its tab applying position.

8. A machine for marking textile articles, comprising upper and lower platens, said upper platen being movable and being provided with means for heating the same, means for mechanically holding and carrying printed tabs presenting thermoplastic material on the reverse, non-printed, side thereof successively to a position beneath said heated upper platen, at least one pin projecting downwardly from the undersurface of the upper platen for piercing a tab, to pick up the same from said mechanical carrying means whilst the platen moves downwardly to apply the same to a textile article supported on said lower platen and means for releasing said tab from said mechanical carrying means substantially simultaneously with the piercing action of the pin.

9. A machine for marking textile articles, comprising heated upper and lower platens said upper platen being movable, a gripper for carrying printed tabs presenting thermoplastic material on the reverse, non-printed, side thereof successively to a position beneath said upper platen, at least one pin projecting downwardly from the undersurface of the upper platen for piercing a tab to pick up the same from the gripper whilst the platen moves downwardly, means for releasing said tab from said gripper substantially simultaneously with the piercing action of the pin.

10. A machine for marking textile articles, comprising a longitudinally movable gripper for carrying printed tabs successively beneath a vertically movable heated platen, said gripper gripping one end of a tab, a deflectable spring arm partially under said platen to support the other end of said tab, at least one pin projecting downwardly from said platen to pierce the tab supported between the gripper and the spring arm and means for simultaneously releasing the tab from the gripper.

11. A machine for marking textile fabrics comprising a longitudinally movable gripper for carrying printed tabs successively beneath a vertically movable heated platen, said gripper gripping one end of a tab, means extendable partially under said platen to support the other end of said tab, means associated with the platen for picking up said tab from said gripper and said support means and means for substantially simultaneously releasing the tab from the gripper.

12. In a marking machine for applying tabs having a thermoplastic content to textile articles, the combination of a stationary lower platen, a vertically movable upper heated platen, means for presenting a tab at a tab receiving station and a horizontally reciprocating gripper movable between said tab receiving station and a position, close to the plane of the upper platen movement, on the opposite side of said platen from the tab receiving station, means for synchronizing the movements of said gripper and said platen so that the gripper passes under the upper platen while it is in its raised position and grips the forward end of a tab presented to it at said tab receiving station and carries the tab to a position where an ungripped portion of the tab is positioned under the upper platen for bonding under conditions of heat pressure to an article placed on the lower platen, the portion of the tab engaged by the gripper projecting laterally from under the upper platen for preservation as an eventual finger piece.

13. In a machine for affixing tabs to textile articles: in combination, a stationary lower platen for supporting a textile article, a vertically movable heated upper platen in opposed relation thereto, a gripper having gripping jaws for engaging a tab in gripping relation at one end of said tab, a tab supply station, means at said station for presenting tabs in endwise relation to the jaws of said gripper, means for positioning said gripper at said tab supply station in such manner as to receive a substantial area of the tab within its jaws, means supporting and actuating said gripper for reciprocating movement along a predetermined path between said supply station and a position adjacent to and on the opposite side of said platen from said supply station, in which said tab is positioned between said platens with the portion held by said gripper projecting outside the area subtended between the surfaces of said platens, and means operating in timed relation to the movement of said movable platen for releasing said gripper from said tab for return to said tab supply station after the movable platen is brought into engagement with the non-gripped portion of said tab in descending to the level of the lower platen.

14. In a machine for forming and affixing marking tabs to textile articles including a tab blank supply station, a printing station and an affixing station; in combination, a lower platen for supporting a textile article at the affixing station, a vertically movable upper platen in opposed relation thereto, a gripper having gripping jaws for receiving a substantial area of a tab blank within said jaws, means at the tab blank supply station for presenting tab blanks in endwise relation to the jaws of said gripper, means for moving said gripper along a predetermined path successively to said blank supply station, said printing station and said affixing station, and means at said several stations movable in timed relation to movement of said gripper to said stations for successively actuating said tab presenting means, said printing means and said affixing means, said gripper-moving means acting to present said gripper at said affixing station with the gripper positioned at one side of the path of said upper platen and the tab positioned between said platens with the portion held by said gripping jaws projecting outside the area subtended between the surfaces of said platens, and means operating in timed relation to downward movement of said upward platen for opening said gripper and releasing the tab held thereby, and means operating in timed relation to the positioning of said upper platen in pressing engagement with a tab being affixed to an article at said affixing station to return said gripper toward said tab blank supply station.

HANS MEYER.
RONALD W. SHEPHERD.

References Cited in the file of this patent
UNITED STATES PATENTS

| Number | Name | Date |
|---|---|---|
| 1,293,959 | Smith | Feb. 11, 1919 |
| 1,343,264 | Givinn | June 15, 1920 |
| 2,235,054 | Von Hofe | Mar. 18, 1941 |
| 2,286,159 | Reynolds | June 9, 1942 |
| 2,300,185 | Von Hofe | Oct. 27, 1942 |
| 2,338,887 | Von Hofe | Jan. 11, 1944 |
| 2,460,214 | Carter | Jan. 25, 1949 |
| 2,479,891 | Adshead | Aug. 23, 1949 |
| 2,489,836 | Von Hofe | Nov. 29, 1949 |
| 2,492,908 | Von Hofe | Dec. 27, 1949 |